(12) United States Patent
Lahav et al.

(10) Patent No.: US 7,708,822 B2
(45) Date of Patent: May 4, 2010

(54) COMPOSITION FOR COATING FRUITS VEGETABLES AND FOWL EGGS ESPECIALLY USEFUL FOR ORGANIC PRODUCE

(75) Inventors: Jacob Lahav, Aniam (IL); Emil Polyansky, Carmiel (IL); Daniel Waldman, Petach Tikva (IL)

(73) Assignee: Natratec International Ltd., Katzerin, K.C. (IL)

( * ) Notice: Subject to any disclaimer, the term of this patent is extended or adjusted under 35 U.S.C. 154(b) by 0 days.

(21) Appl. No.: 10/482,342

(22) PCT Filed: Jun. 26, 2002

(86) PCT No.: PCT/IL02/00514

§ 371 (c)(1),
(2), (4) Date: Jul. 12, 2004

(87) PCT Pub. No.: WO03/001921

PCT Pub. Date: Jan. 9, 2003

(65) Prior Publication Data

US 2004/0241288 A1 Dec. 2, 2004

(30) Foreign Application Priority Data

Jun. 28, 2001 (IL) .................................... 144058

(51) Int. Cl.
A23B 5/06 (2006.01)
A23B 7/16 (2006.01)
A23L 1/212 (2006.01)
A23L 1/32 (2006.01)
C08L 91/00 (2006.01)
C09D 191/00 (2006.01)

(52) U.S. Cl. .......................... 106/244; 426/30; 426/302; 426/305; 426/308; 426/310; 427/4; 427/359; 427/424; 427/426; 118/DIG. 6; 516/38; 516/73; 106/245

(58) Field of Classification Search .................. 106/271, 106/244, 245; 426/30, 302, 305, 308, 310; 427/4, 359, 424, 426; 118/DIG. 6; 516/38, 516/929, 73

See application file for complete search history.

(56) References Cited

U.S. PATENT DOCUMENTS

| | | | | |
|---|---|---|---|---|
| 2,019,758 A | * | 11/1935 | Macrill | .......................... 516/43 |
| 2,042,857 A | * | 6/1936 | Nelson | ......................... 426/307 |
| 2,153,487 A | | 4/1939 | Sharma | |
| 2,412,686 A | * | 12/1946 | Kalmar | ....................... 426/308 |
| 2,464,529 A | * | 3/1949 | Recker | ........................ 426/302 |
| 3,120,834 A | | 2/1964 | Goldhaft et al. | |
| 3,420,790 A | | 1/1969 | Katchalsky et al. | |
| 3,997,674 A | * | 12/1976 | Ukai et al. | ..................... 426/90 |
| 4,946,694 A | * | 8/1990 | Gunnerson et al. | .......... 426/273 |
| 4,990,351 A | | 2/1991 | Orman et al. | |
| 5,101,763 A | | 4/1992 | Creason et al. | |
| 6,482,455 B1 | * | 11/2002 | Freire et al. | .................. 426/310 |

FOREIGN PATENT DOCUMENTS

| | | |
|---|---|---|
| CN | 1087786 A | 6/1994 |
| CN | 1148938 A | 5/1997 |
| CN | 1159286 A | 9/1997 |
| JP | 58-63374 A | 4/1983 |

OTHER PUBLICATIONS

Sigma Productinformation—Agar, pp. 1-6, Oct. 15, 1996.*
Matthies, Eur J Lipid Scii Technol, 103 (2001) pp. 239-248.*
Wang, Qivan "Nature-occurring food antistaling agent and the use thereof", *Jiangsu Shipin Yu Faiiao*, No. 3(2000)pp. 36-38.
Zhang, Xiaoyan and Liu, Weimin "Fruit and vegetable coating technique trends in China and foreign countries", *Food Science and Technology*, No. 6t(2000)pp. 2-3.
L. Xie et al., "Edible Film Coating to Minimize Eggshell Breakage and Reduce Post-Wash Bacterial Contamination Measured by Dye Penetration in Eggs," Journal of Food Science, vol. 67, Issue 1(2002) pp. 280-284.
Y. C. Wong et al., "Evaluation of Mechanical and Barrier Properties of Protein Coatings on Shell Eggs," Poultry Science(1996.) vol. 75, pp. 417-422.
O. Feygenberg et al., "Postharvest Use of Organic Coating for Maintaining Bio-Organic Avocado and Mango Quality," ISHS Acta Horliculturae No. 682, Proceedings of the International Postharvest Symposium No. 5, Verona, Italy (Jun. 2004)ISBN 90-6605-648-7.
Remy, Heinrich, "Lehrbuch der Anorganischen Chemie," Akademische Verlagsgesellschaft Geest & Portig K.G., pp. 6.
Mishra, Dheeraj, "Aqueous Enzymatic Extraction of Oil from Madarin Peels," Journal of OLEO Science, vol. 54, No. 6, pp. 355-359, 2005.
Hagenmaier et al. (J. Agric. & Food Chem. 45 (2) 349-352, 1997) Summary Enclosed.
Edible Coatings and Films to Improve Food Quality, Krochta, Baldwin & Nisperos Editors, Technomic Publ., N.Y., 1994, p. 37-50.
Kajiura, Y., "The antibacterial properties of spices and components thereof" The Takasago Times, 1984: Republication No. 82; Serial No. 139; pp. 8-15.

* cited by examiner

*Primary Examiner*—David M Brunsman
(74) *Attorney, Agent, or Firm*—The Nath Law Group; Susanne M. Hopkins; Ari G. Zytcer

(57) ABSTRACT

The invention relates to a composition for coating fruits, vegetables, fowl eggs, and especially for organically-grown produce for protection and extension of the shelf life of said fruits, vegetables and fowl eggs, wherein said composition is an aqueous dispersion comprised of: (a) a hydrophobic component comprising at least one member of the following group consisting of natural wax, or vegetable oil; (b) an alkali agent; (c) water, wherein components (a) and (b) are derived from natural biological sources. The invention also relates to a method for application of the composition.

25 Claims, No Drawings

COMPOSITION FOR COATING FRUITS VEGETABLES AND FOWL EGGS ESPECIALLY USEFUL FOR ORGANIC PRODUCE

This application is a 371 filing of PCT/IL02/00514, filed Jun. 26, 2002.

FIELD OF THE INVENTION

The present invention relates to a composition for coating fresh produce, such as fruits, vegetables, and fowl eggs, to protect and extend the shelf life of said produce. The composition of the present invention is especially useful for protecting fruits and vegetables grown organically.

BACKGROUND OF THE INVENTION

In marketing of fresh produce, namely fruits, vegetables and fowl eggs, several weeks may pass from harvest of the agricultural produce or gathering of the eggs, to the sale and use of the fresh produce. During this time, aerobic respiration continues through the semi-porous skins of the fruits, vegetables, and eggs. In fruits and vegetables, senescence is induced in this period by continued release of the plant hormones ethylene and auxin, which results in breakdown of sugars and evaporation of water from within the fruit. This aging in fruits and vegetables, is unwanted, since it results in obvious changes in the outer appearance, in the texture and in the taste of the produce. In fowl eggs as well, dehydration and aerobic respiration occur through the eggshell, and spoilage of the egg occurs over time due to entry of microorganisms through minute pores in the shell. Prior art attempts at delaying the aging process in fresh produce involve coating the produce with a film to decrease the rate of respiration. The coatings in use are semi-porous, since a totally impermeable coating leads to anaerobic respiration within the produce, which results in fermentation and spoilage. Often a wax is used in combination with a fungicide; the wax also provides the fruit with a shiny, desirable appearance. Polyethylene coatings have been used in the past. Currently, a widely used treating reagent is sodium orthophenylphenate (SOPP), which ionizes in solution to orthophenylphenol (OPP). Fruits are usually coated by soaking them in soaking tanks containing the treating reagents, or by applying the reagents in the form of a foam. U.S. Pat. No. 4,990,351 (Sunkist Growers, Inc.), relates to a method of application of SOPP to fruit. U.S. Pat. No. 5,101,763 discloses an automated apparatus for coating fruit with a first mixture of wax and fungicide, and a second coating of wax alone. U.S. Pat. No. 4,946,694 relates to a coating applied in a two-step process, useful to coat fruits that have sugary deposits on their skins ("sticky fruit") such as dried fruits, dates and figs. First a mixture which includes a vegetable wax, vegetable oil and a wetting agent, is applied to the sticky fruit, then a second mixture which contains a protein is applied.

Organically grown agricultural produce is sought after by those who consider use of chemical treatment of fruits and vegetables to be a health hazard. Not only are chemical fertilizers unacceptable in the organic produce market, post-harvest treatments are equally unacceptable, such as application of chemical coatings on the produce. The need exists for a coating composition for protection of agricultural produce, deemed acceptable to the organic produce market. It is the object of the present invention to provide a composition for the coating of fruits and vegetables, which provides an answer to the demand for minimal chemical treatment of agricultural produce, yet protects and lengthens the shelf-life of the fresh produce. The composition of the present invention may be applied to organically-grown fruits and vegetables, as well as to the wider market which supplies the public with fruits and vegetables grown using chemical fertilizers. The present invention may be applied as well to fowl eggs of any source.

Certain natural waxes have been noted to be useful for protection of fruits and vegetables, when these waxes are applied as an external coating on the skin of the produce. Beeswax, candelilla wax, and carnauba wax have been used for this purpose. These natural waxes are highly concentrated and thus, cannot be applied without being diluted, since application of the concentrated form would result in a totally impermeable coating which would induce fermentation in the produce. These highly hydrophobic waxes need thus be formulated in a composition that can be applied evenly on all areas on the skin of the produce. U.S. Pat. No. 3,997,674 discloses a formulation essentially containing a natural wax, or a vegetable or mineral oil, and a high molecular weight polymer. Hagenmaier & Baker describe application of emulsions containing various combinations of natural waxes to Valencia oranges (J. Agric. & Food Chem. 45 (2), 349-352, 1997). Various coatings based on natural waxes have been described for a wide variety of fruits (Edible Coatings and Films to Improve Food Quality, Krochta, Baldwin & Nisperos Editors, Technomic Publ., N.Y., 1994, p. 37-50). None of the above-mentioned coatings would be acceptable to the organic produce market, for though they are based on natural waxes, they contain unacceptable synthetic additives that act as emulsifiers, plasticizers, anti-foaming agents, surfactants and preservatives (ibid.). It is the object of the present invention to provide a coating composition for protection of fruit, which does not contain synthetic additives unacceptable for the organic produce market.

These and other objects of the present invention will become more apparent from the detailed description of the preferred embodiments, that follows.

DEFINITIONS

In the present invention, the term "natural biological sources" refers to plant or animal sources.

In the present invention, the term "natural wax" refers to a wax originating from a plant or animal source.

In the present invention, the term "fresh produce" refers to fruits, vegetables, and fowl eggs.

In the present invention, the term "ethanolic extract" refers to is this an extract of material from botanical origin, extracted using ethanol as a solvent.

In the present invention, the term "alkali agent" refers to a compound capable of changing the pH of a composition to which it is added, to be within the range of pH6-pH 9.5.

SUMMARY OF THE INVENTION

There is thus provided in the present invention a composition for coating fruits, vegetables, fowl eggs, and especially for organically-grown produce, useful for protection and extension of the shelf life of said fruits, vegetables and fowl eggs. The composition is an aqueous dispersion comprised of:

a) a hydrophobic component comprising at least one member of the following group consisting of natural wax, or vegetable oil;

b) an alkali agent;

c) water;

d) an additive selected from rosemary extract, sage extract, green tea water, eucalyptus oil, lavender oil, citrus peel oil, ethanol, chamomile ethanolic extract, cypress ethanolic extract, prickly pear ethanolic extract, or aloe ethanolic extract;

wherein components (a), (b) and (d) are derived from natural biological sources.

In accordance with a preferred embodiment of the present invention, the composition additionally comprises an emulsifier.

Further, according to a preferred embodiment of the present invention, the emulsifier is selected from, nicotinic acid, pantothenic acid, ascorbic acid, vitamin B3 salt, vitamin B5 salt, wood rosin, soft resin, shellac, free acids of a natural wax, or salts or derivatives thereof.

Still further, according to a preferred embodiment of the present invention, the concentration of said emulsifier is in the range of 0.1-3% by weight of said dispersion.

Additionally, according to a preferred embodiment of the present invention, in the composition the natural wax is selected from the group consisting of beeswax, candelilla wax, carnauba wax, or berrywax.

Moreover, according to a preferred embodiment of the present invention, in the composition, the vegetable oil is selected from the group consisting of soybean oil, palm oil, corn oil, wheat germ oil, olive oil, linseed oil, cotton seed oil, sunflower oil, rapeseed oil, sesame oil or grapeseed oil.

Further, according to a preferred embodiment of the present invention, the alkali agent is selected from the group consisting of sodium carbonate, sodium bicarbonate, potassium carbonate, potassium bicarbonate, sodium hydroxide, or potassium hydroxide.

Still further, according to a preferred embodiment of the present invention, the composition additionally comprises a protective colloid.

Moreover, in certain embodiments the concentration of the protective colloid is not greater than 1% by weight of the dispersion.

Additionally, according to a preferred embodiment of the present invention, the protective colloid is selected from the group consisting of a protein, a polysaccharide, a phosphoprotein, or a phospholipid.

Further, according to a preferred embodiment of the present invention, said protein is selected from casein, or gelatin.

Still further, according to a preferred embodiment of the present invention, said phospholipid is lecithin.

Moreover, according to a preferred embodiment of the present invention, said polysaccharide is selected from xanthan, dextrin, alginic acid, agar, or guar gum.

In one preferred embodiment, the above-listed additives are present at a concentration not greater than 15% by weight of the final dispersion.

Moreover, according to a preferred embodiment of the present invention, the dispersion has a pH in the range of 6-10.

Further, according to a preferred embodiment of the present invention, the hydrophobic component of the dispersion constitutes 0.01-9% by weight of said dispersion.

Still further, according to a preferred embodiment of the present invention, the fruits to which the composition is applied are selected from apples, olives, peaches, plums, lemons, kiwis, oranges, mandarins, avocados, melons, mangos, pineapples, strawberries, kumquats, figs or cherries.

In addition, according to a preferred embodiment of the present invention, the fruit to which the composition is applied is a citrus fruit.

Moreover, according to a preferred embodiment of the present invention, the vegetables to which the composition is applied are selected from cucumbers, or tomatoes.

There is also provided in the present invention a method for application of the composition defined above, upon agricultural produce and fowl eggs, comprising dipping said produce or said fowl eggs into the composition, or spreading said composition on the surface of said produce or said fowl eggs; followed by dehydrating said composition.

DETAILED DESCRIPTION OF THE INVENTION

It is appreciated that the detailed description that follows is intended only to illustrate certain preferred embodiments of the present invention. It is in no way intended to limit the scope of the invention, as set out in the claims.

The present invention discloses an edible coating for agricultural produce and fowl eggs, that acts to protect the fresh produce and extend its shelf life. The coating is semi-permeable and thus slows the rate of respiration in the produce, which retards senescence and spoilage. The coating hereby disclosed is unique over prior art coatings in that all its components are acceptable for use on organic produce, since the principal components are of natural biological origin, and the optional components have such a high grade of purity and non-toxicity that they are approved by the U.S. Food & Drug Administration for use in "biopure" products. The natural biological coating components are preferably derived from their biological sources with minimal chemical intervention, such as by gentle extraction and pressing methods, and not by chemical synthesis, and thus the components and the end-product they form, are favored by the consumers of organic produce.

In the present invention, the coating composition is an aqueous dispersion having as the principal components at least one natural wax of animal or botanical origin, and/or at least one vegetable oil; an alkali agent to correct the pH of the dispersion, and water as the dispersing medium. The natural wax and/or vegetable oil, and the alkali agent are derived from natural biological sources.

The natural wax or vegetable oil effectively form a hydrophobic semi-permeable barrier on the fresh produce, that slows the exchange of gasses from within the produce, thus prevents aging and prevents entry of pathogens into the produce. Preferable natural waxes are (in descending order of preference): beeswax, berrywax, carnauba wax, or candelilla wax. Preferable vegetable oils are soybean oil, linseed oil, cottonseed oil, palm oil, corn oil, wheat germ oil, olive oil, sunflower oil, rapeseed oil, sesame oil or grapeseed oil.

The alkali agent acts within the coating composition before the coating hardens, to shift the pH of the composition to within a desired range before the coating is applied to the fresh produce. Preferably, the alkali agent shifts the pH to within the range of pH 6-10, as measured before application of the coating upon the produce. Preferable alkali agents are sodium carbonate, sodium bicarbonate, potassium carbonate, potassium bicarbonate, sodium hydroxide, or potassium hydroxide.

The composition may optionally include additional ingredients that act to stabilize the dispersion or to slow the exchange of gasses from within the fruit. These additives include emulsifiers, protective colloids, ethanol and etheric oils to stabilize the dispersion; ethanolic extracts and aqueous plant extracts, to act synergistically with the natural wax or vegetable oil in delaying the aging process of the fresh produce.

Preferable emulsifiers that may optionally be used, are wood rosin, soft resin, or shellac (insect derived). In addition, certain low-molecular weight compounds (hereby listed) aid in dissolving natural waxes in aqueous medium, and thus may be considered emulsifiers. These include nicotinic acid, ascorbic acid, patothenic acid, vitamin B3 salt, and vitamin B5 salt. The free acids present in the natural wax also grant emulsification of the wax. The concentration of the emulsifier is preferably 0.1-3% by weight of the dispersion.

Protective colloids that may be added are preferably proteins (for instance casein or gelatin), polysaccharides (for instance xanthan, dextrin, alginic acid, agar, guar gum), phospholipids (for instance lecithin), or phosphoproteins. Preferably, the concentration of the protective colloid is not greater than 1% by weight of the dispersion.

Etheric oils that can optionally be included in the dispersion are preferably eucalyptus oil, lavender oil, and citrus peel oil. Aqueous or ethanolic extracts of various botanical origin that can optionally be included in the dispersion include, for instance, rosemary extract, sage extract, green tea water, chamomile ethanolic extract, cypress ethanolic extract, prickly pear ethanolic extract, and aloe ethanolic extract.

Preferably, the hydrophobic components of the dispersion, which include the natural waxes or vegetable oils, and optionally additional oils such as etheric oils, constitute 0.01-9% by weight of the dispersion.

The coating composition is applied to fresh produce using the following method:

The fresh produce is dipped into the composition, or spread on the surface of the produce. The composition is made to undergo dehydration, most often by placing the fresh produce under an air current. Dehydration of the composition results in its hardening to a hard coat.

The coating is useful to protect fruits, vegetables and fowl eggs. It is especially useful for organically-grown produce, but is not limited to organically-grown produce, and may be applied to fresh produce for the wider market which supplies the public with fruits and vegetables grown using chemical fertilizers. The present invention may be applied to fowl eggs of any source, as well as to "organic" fowl eggs (produced by laying hens that have not received treatments such as hormone treatments).

The coating was applied to apples, olives, peaches, plums, lemons, kiwis, mandarins, avocados, melons, mangoes, cucumbers, tomatoes and chicken eggs, and was proven to be effective in prolonging the shelf of the above-mentioned produce, as shown in the following examples.

Example 1

An aqueous dispersion was prepared according to the following component composition:

| Component | Conc., % (wt./wt.) |
|---|---|
| Beeswax | 0.9 |
| Jojoba Bean Oil | 0.1 |
| Soft Resin | 0.3 |
| Sodium Carbonate | ~0.06 (until pH level 9.5) |
| Water | Up to 100 |

The dispersion was prepared by first adding soft resin to the water, and adding sodium carbonate while mixing. The resultant solution was an emulsifier, which was then heated to 80-85° C. The solution was blended at approximately 25,000 RPM and a pre-melted mixture of jojoba bean oil+liquefied beeswax was added while blending. The jojoba bean oil acts in lowering the rate of respiration in the fruit upon which the end-product composition is applied. Moreover, the addition of jojoba oil allows a lower concentration of wax to be used in the composition. Upon cooling, a dispersion was obtained, which was then used to coat agricultural produce.

In this example, Star King apples were coated with the above-mentioned dispersion by dipping of the apples into the dispersion and drying under an air stream. The coated apples were stored at ambient temperature (20-25° C.), and their external appearance and percentage of weight loss were followed over a period of several weeks, and compared to the appearance and percent weight loss seen in uncoated control apples. The results were as follows (Table 1):

TABLE 1

| | Weight loss (%) | |
|---|---|---|
| Time | Coated Apples | Control Apples |
| 7 days | 1.0 | 1.8 |
| 14 days | 2.3 | 3.9 |
| 21 days | 3.1 | 5.3 |
| 28 days | 3.6 | 6.6 |
| 35 days | 4.2 | 7.8 |
| 42 days | 5.0 | 9.0 |
| 49 days | 5.9 | 10.3 |
| 56 days | 6.5 | 11.8 |
| 63 days | 7.1 | 13.2 |

The results portrayed in Table 1 illustrate the percentage of weight loss was significantly lower in the coated apples versus the uncoated apples. The coated apples retained their external appearance throughout 63 days of storage, while uncoated apples began to show signs of decay. Taste tests were performed when the experiment was ended, and showed the coated apples retained their taste over the length of the experiment, while in uncoated apples the taste was marred by the end of the experiment.

Example 2

An aqueous dispersion of the following components was prepared:

| Component | Conc., % (wt./wt.) |
|---|---|
| Berrywax | 2.0 |
| Coconut oil | 0.05 |
| Aqueous green tea extract | 5.0 |
| Wood rosin | 0.5 |
| Potassium hydroxide | ~0.08 (to pH 8.7) |
| Water | Up to 100 |

The dispersion was prepared by adding wood rosin to the water, then adding potassium hydroxide and aqueous green tea extract, while blending. The resultant solution obtained acts as an emulsifier. This solution was heated to 55-60° C., and blended at approximately 25,000 RPM with a pre-dissolved mixture of coconut oil and liquefied berrywax. The resultant aqueous dispersion was cooled and applied to cucumbers by dipping the cucumbers into said dispersion and drying under a hot air-stream.

The coated cucumbers were stored at a temperature of 10° C. for 21 days, during which their external appearance and their weight loss were recorded, and compared with uncoated cucumbers stored under identical conditions. Results were as follows (Table 2):

TABLE 2

| Time | Weight loss (%) | |
|---|---|---|
| | Coated Cucumbers | Control Cucumbers |
| 7 days | 2.1 | 6.7 |
| 14 days | 4.3 | 10.8 |
| 21 days | 6.7 | 16.9 |

The results shown in Table 2 show less weight loss in the coated cucumbers versus the uncoated cucumbers, and coated cucumbers retained their outward appearance over a prolonged period of storage (21 days). Uncoated cucumbers showed signs of wilting after this time. Taste tests indicated coated cucumbers rated higher than uncoated cucumbers.

Example 3

An aqueous dispersion of the following components was prepared:

| Component | Conc., % (wt./wt.) |
|---|---|
| Beeswax | 5.0 |
| Lecithin | 1.0 |
| Aqueous rosemary extract | 5.0 |
| Sodium nicotinate | 0.2 |
| Sodium bicarbonate | ~0.01 (to pH 6.0) |
| Water | Up to 100 |

The dispersion was prepared by addition of lecithin, which functions as a protective colloid, and an aqueous extract of rosemary, which has anti-septic activity, to a solution of sodium nicotinate. The sodium nicotinate functions as an emulsifier. The resultant mixture was heated to 70-75° C., and molten beeswax was added while blending at high speed (approximately 25,000 RPM).

The dispersion was cooled and used to coat olives. The olives were dried after coating, using a stream of hot air. The olives were stored at 9° C. for 35 days, and the percentage of weight loss and their outward appearance was recorded and compared with a control group of untreated olives stored under identical conditions. Results are seen in Table 3.

TABLE 3

| Time | Weight loss (%) | |
|---|---|---|
| | Coated olives | Control olives |
| 7 days | 2.2 | 4.2 |
| 14 days | 4.5 | 7.5 |
| 21 days | 7.0 | 10.7 |
| 28 days | 10.4 | 15.1 |
| 35 days | 14.6 | 19.8 |

Results show the coated olives lost less weight than uncoated control olives.

Example 4

An aqueous dispersion of the following components was prepared:

| Component | Conc., % (wt./wt.) |
|---|---|
| Beeswax | 4.0 |
| Chamomile ethanolic extract | 3.0 |
| Sodium carbonate | ~0.06 (to pH 8.4) |
| Water | Up to 100 |

The dispersion was prepared by adding an aqueous solution containing sodium carbonate and chamomile ethanolic extract to the melted beeswax component, at a temperature of 67-72° C., while blending rapidly (at approx. 25,000 RPM).

The resultant dispersion was cooled and applied to the skins of peaches, and an air current was applied to dehydrate the dispersion into a hardened coating. The peaches were stored at a temperature of 8° C. for 18 days, during which time their degree of weight loss and changes in their outer appearance were observed, and compared to a control group of uncoated peaches stored under identical conditions. The results are shown in Table 4.

TABLE 4

| Time | Weight loss (%) | |
|---|---|---|
| | Coated Peaches | Control Peaches |
| 7 days | 4.8 | 13.5 |
| 14 days | 9.3 | 25.2 |
| 18 days | 10.6 | 28.7 |

The results shown in Table 4 indicate less weight loss in the coated peaches versus the uncoated peaches. The coated peaches retained their outward appearance over a prolonged period of storage (18 days). Uncoated peaches showed signs of wilting after this time. Taste tests indicated coated peaches rated higher than uncoated peaches.

Example 5

An aqueous dispersion of the following components was prepared:

| Component | Conc., % (wt./wt.) |
|---|---|
| Carnauba wax | 3.5 |
| Olive oil | 0.4 |
| Lavender oil | 0.05 |
| Alginic acid | 0.1 |
| Shellac | 1.0 |
| Sodium carbonate | ~0.15 (to pH 8.5) |
| Water | To complete 100 |

The dispersion was prepared by combining shellac (derived from insects), sodium carbonate and alginic acid while blending at approx. 25,000 RPM, at a temperature of 87-92° C. While blending was continued, lavender oil was then added, followed by a pre-dissolved mixture of liquefied carnauba wax and olive oil. The resultant dispersion was cooled, and applied to the skins of plums, and an air current was applied to dehydrate the dispersion into a hardened coating. The plums were stored at ambient temperature for 16 days, during which time their degree of weight loss and changes in their outer appearance were observed, and compared to a control group of uncoated plums stored under identical conditions. The results are shown in Table 5.

TABLE 5

|      | Weight loss (%) | |
| --- | --- | --- |
| Time | Coated Plums | Control Plums |
| 2 days | 1.4 | 3.0 |
| 6 days | 3.6 | 7.4 |
| 9 days | 5.3 | 10.4 |
| 13 days | 7.2 | 14.8 |
| 16 days | 8.9 | 17.9 |

Weight loss was reduced in the coated plums compared to the uncoated plums, and external appearance of the coated fruit was retained. Taste tests rated the coated plums better than the uncoated plums.

Example 6

An aqueous dispersion of the following components was prepared

| Component | Conc., % (wt./wt.) |
| --- | --- |
| Candelilla wax | 3.0 |
| Soybean oil | 0.3 |
| Casein | 0.1 |
| Aqueous sage extract | 2.5 |
| Sodium pantothenate | 0.7 |
| Sodium carbonate | ~0.08 |
|  | (to pH 7.5) |
| Water | Up to 100 |

Casein and aqueous sage extract were add to the sodium pantothenate, which acts as an emulsifier. Casein acts as a protective colloid assuring stability of the end-product dispersion. Liquefied candelilla wax (having a temperature of 70-75° C.) was added while blending at approx. 25,000 RPM. The resultant dispersion was cooled and applied to the skins of cherry tomatoes. The tomatoes were placed under an air current, resulting in dehydration of the dispersion to form a hard coating. The tomatoes were stored at room temperature for 27 days, during which their degree of weight loss and external appearance were recorded, and compared to control uncoated tomatoes stored under identical conditions. Results are shown in Table 6.

TABLE 6

|      | Weight loss (%) | |
| --- | --- | --- |
| Time | Coated Tomatoes | Control Tomatoes |
| 5 days | 1.1 | 2.7 |
| 12 days | 3.1 | 6.0 |
| 19 days | 4.7 | 8.9 |
| 27 days | 6.8 | 12.4 |

Weight loss was reduced in the coated tomatoes compared to the uncoated tomatoes, and external appearance of the coated fruit was retained. Taste tests rated the coated tomatoes better than the uncoated tomatoes.

Example 7

An aqueous dispersion of the following components was prepared:

| Component | Conc., % (wt./wt.) |
| --- | --- |
| Beeswax | 6.0 |
| Wheat germ oil | 3.0 |
| Guar gum | 0.2 |
| Citrus pea oil | 0.25 |
| Shellac | 0.9 |
| Sodium carbonate | ~0.12 |
|  | (to pH 9.0) |
| Water | Up to 100 |

The dispersion was prepared by forming an aqueous solution of shellac, sodium carbonate and guar gum, heating to 75-80° C., then adding citrus peel oil while blending (at approximately 25,000 RPM). A pre-dissolved mixture of liquefied beeswax and wheat germ oil was then added while blending was continued. The resultant dispersion was cooled, and applied to lemons upon the external peel. The lemons were placed under an air current, resulting in dehydration of the dispersion to form a hard coating. The lemons were stored at 8° C. for 30 days, during which their degree of weight loss and external appearance were recorded, and compared to control uncoated lemons stored under identical conditions. Results are shown in Table 7.

TABLE 7

|      | Weight loss (%) | |
| --- | --- | --- |
| Time | Coated Lemons | Control Lemons |
| 3 days | 0.9 | 4.0 |
| 5 days | 2.0 | 8.6 |
| 10 days | 3.6 | 14.4 |
| 20 days | 6.0 | 22.0 |
| 30 days | 9.8 | 34.1 |

Weight loss was reduced in the coated lemons compared to the uncoated lemons, and external appearance of the coated fruit was retained. Taste tests rated the coated lemons better than the uncoated lemons.

Example 8

An aqueous dispersion of the following components was prepared:

| Component | Conc., % (wt./wt.) |
| --- | --- |
| Berrywax | 4.0 |
| Gelatin | 0.15 |
| Cypress needles ethanolic extract | 3.0 |
| Sodium ascorbate | 0.6 |
| Sodium bicarbonate | ~0.05 |
|  | (to pH 6.0) |
| Water | Up to 100 |

The dispersion was prepared by adding the gelatin and the Cypress needles ethanolic extract to a sodium ascorbate solution. The gelatin and the ethanolic extract act as protective colloids, to stabilize the final end-product dispersion. The sodium ascorbate acts as an emulsifier. The berrywax component was liquefied by pre-heating to 60-65° C., then added to the above-mentioned components while blending at approx. 25,000 RPM. The resultant dispersion was cooled, and applied to kiwis upon the kiwi peel. The kiwis were placed under an air current, resulting in dehydration of the dispersion to form a hard coating. The kiwis were stored at room temperature for 21 days, during which their degree of weight loss and external appearance were recorded, and compared to control uncoated kiwis stored under identical conditions. Results are shown in Table 8.

TABLE 8

| Time | Weight loss (%) | |
|---|---|---|
| | Coated Kiwi | Control Kiwi |
| 7 days | 1.8 | 7.3 |
| 14 days | 4.6 | 14.4 |
| 21 days | 6.9 | 22.1 |

Weight loss was reduced in the coated kiwis compared to the uncoated kiwis, and external appearance of the coated fruit was retained. Taste tests rated the coated kiwis better than the uncoated kiwis.

Example 9

An aqueous dispersion of the following components was prepared:

| Component | Conc., % (wt./wt.) |
|---|---|
| Beeswax | 5.0 |
| Corn germ oil | 0.25 |
| Dextrin | 0.07 |
| Prickly pear ethanolic extract | 2.5 |
| Sodium carbonate | ~0.08 (to pH 8.0) |
| Water | Up to 100 |

The dispersion was prepared by dissolving the sodium carbonate and dextrin in water, then heating to 75-80° C. A pre-dissolved mixture of liquefied beeswax and corn germ oil was added to this while blending at approx. 25,000 RPM, as was the prickly pear ethanolic extract. The resultant dispersion was cooled, and applied to mandarins upon the peels. The mandarins were placed under an air current, resulting in dehydration of the dispersion to form a hard coating. The mandarins were stored at 8° C. for 63 days, during which their degree of weight loss and external appearance were recorded, and compared to control uncoated mandarins stored under identical conditions. Results are shown in Table 9.

TABLE 9

| Time | Weight loss (%) | |
|---|---|---|
| | Coated Mandarins | Control Mandarins |
| 7 days | 1.7 | 4.1 |
| 14 days | 3.1 | 7.9 |
| 21 days | 4.3 | 11.1 |
| 28 days | 5.7 | 14.4 |
| 35 days | 7.2 | 17.1 |
| 42 days | 8.5 | 20.1 |
| 49 days | 9.6 | 22.4 |
| 56 days | 10.7 | 24.6 |
| 63 days | 12.1 | 26.8 |

Weight loss was reduced in the coated mandarins compared to the uncoated mandarins, and external appearance of the coated fruit was retained. Taste tests rated the coated mandarins better than the uncoated mandarins.

Example 10

An aqueous dispersion of the following components was prepared:

| Component | Conc., % (wt./wt.) |
|---|---|
| Beeswax | 4.0 |
| Palm oil | 0.4 |
| Aloe ethanolic extract | 5 |
| Agar-Agar | 0.1 |
| Soft resin | 3.0 |
| Sodium hydroxide | ~0.6 (to pH 9.0) |
| Water | Up to 100 |

The dispersion was prepared by adding soft resin to the water component, and sodium hydroxide was added while blending. The resultant solution is an emulsifier. The solution was heated to 67-73° C., and a pre-dissolved mixture of liquefied beeswax and palm oil was added while blending (at approx. 25,000 RPM). The remaining components were then added. The dispersion was cooled, then applied to avocados (Reed Strain). The avocados were placed under an air current, resulting in dehydration of the dispersion to form a hard coating. The avocados were stored at 6° C. for 35 days, then at room temperature for 7 additional days, during which their degree of weight loss and external appearance were recorded, and compared to control uncoated avocados stored under identical conditions. Results are shown in Table 10.

TABLE 10

| Time | Weight loss (%) | |
|---|---|---|
| | Coated Avocados | Control Avocados |
| 7 days | 0.7 | 3.9 |
| 14 days | 1.6 | 6.3 |
| 21 days | 2.5 | 8.3 |
| 28 days | 3.5 | 10.2 |
| 35 days | 4.8 | 13.4 |
| 42 days | 8.2 | 21.2 |

The results recorded during the last 7 days of the experiment refer to the period when the avocados were stored at room temperature. Weight loss was reduced in the coated fruit compared to the uncoated fruit, and external appearance of the coated fruit was retained. Taste tests rated the coated fruit better than the uncoated fruit.

Example 11

An aqueous dispersion of the following components was prepared:

| Component | Conc., % (wt./wt.) |
|---|---|
| Beeswax | 4.0 |
| Soybean germ oil | 0.2 |
| Sodium ascorbate | 1.0 |

-continued

| Component | Conc., % (wt./wt.) |
|---|---|
| Sodium carbonate | ~0.05 (to pH 9.2) |
| Ethanol | 3.0 |
| Water | Up to 100 |

The dispersion was prepared by forming an aqueous solution of sodium carbonate, sodium ascorbate and ethanol. The solution was heated to 67-72° C., and a pre-dissolved mixture of liquefied beeswax and soybean germ oil was added while blending at approx. 25,000 RPM. The resultant dispersion was cooled and applied to avocados (Hass strain).

The avocados were placed under an air current, resulting in dehydration of the dispersion to form a hard coating. The avocados were stored at 6° C. for 26 days, then at room temperature for 13 additional days, during which their degree of weight loss and external appearance were recorded, and compared to control uncoated avocados stored under identical conditions. Results are shown in Table 11.

TABLE 11

| | Weight loss (%) | |
|---|---|---|
| Time | Coated Avocados | Control Avocados |
| 7 days | 1.3 | 2.6 |
| 14 days | 2.2 | 4.0 |
| 26 days | 3.7 | 6.2 |
| 29 days | 5.8 | 8.8 |
| 39 days | 11.2 | 16.0 |

The results recorded during the last 13 days refer to the period when the avocados were stored at room temperature. Weight loss was reduced in the coated fruit compared to the uncoated fruit, and external appearance of the coated fruit was retained. Taste tests rated the coated fruit better than the uncoated fruit.

Example 12

An aqueous dispersion of the following components was prepared:

| Component | Conc., % (wt./wt.) |
|---|---|
| Beeswax | 5.0 |
| Candelilla wax | 2.5 |
| Lecithin | 0.2 |
| Eucalyptus oil | 0.15 |
| Sodium ascorbate | 0.8 |
| Water | Up to 100 |

The dispersion was prepared by forming a solution of sodium ascorbate and lecithin, then heating to 70-75° C. A pre-dissolved mixture of liquefied beeswax and candelilla wax were then added while blending, followed by addition of eucalyptus oil while blending. The resultant dispersion was applied to melons upon the outer peels. The melons were placed under an air current, resulting in dehydration of the dispersion to form a hard coating. The melons were stored at 8° C. for 28 days, during which their degree of weight loss and external appearance were recorded, and compared to control uncoated melons stored under identical conditions. Results are shown in Table 12.

TABLE 12

| | Weight loss (%) | |
|---|---|---|
| Time | Coated Melons | Control Melons |
| 2 days | 0.9 | 1.6 |
| 7 days | 3.2 | 5.2 |
| 14 days | 4.9 | 8.2 |
| 21 days | 6.7 | 10.8 |
| 28 days | 8.1 | 14.6 |

Weight loss was reduced in the coated fruit compared to the uncoated fruit, and external appearance of the coated fruit was retained. Taste tests rated the coated fruit better than the uncoated fruit.

Example 13

An aqueous dispersion of the following components was prepared:

| Component | Conc., % (wt./wt.) |
|---|---|
| Beeswax | 4.0 |
| Linseed oil | 0.2 |
| Soft resin | 1.0 |
| Sodium carbonate | ~0.25 (to pH 8.8) |
| Ethanol | 3.0 |
| Water | Up to 100 |

The dispersion was prepared by dissolving the soft resin in the water, then adding the sodium carbonate while mixing. The resultant solution, which acts as an emulsifier, was heated to 70-75° C., and a pre-dissolved mixture of linseed oil and liquefied beeswax was added while blending (at approx. 25,000 RPM). Ethanol was then added. The resultant dispersion was cooled, and applied to Mangos (Tommi strain).

The mangos were placed under an air current, resulting in dehydration of the dispersion to form a hard coating. The mangos were stored at 12° C. for 3 weeks, then at room temperature for 16 additional days, during which their degree of weight loss and external appearance were recorded, and compared to control uncoated mangos stored under identical conditions. Results are shown in Table 13.

TABLE 13

| | Weight loss (%) | | |
|---|---|---|---|
| | After 3 weeks (12° C.) | After 6 more days (room temp.) | After 16 days (room temp.) |
| Coated Mangos | 0.8 | 2.2 | 3.1 |
| Control Mangos | 1.2 | 3.5 | 5.1 |

Biochemical assays were performed 27 days after the coating was applied in order to determine the percentage of sugar and acid of the mangos, as compared with that of control mangos. As previously stated, during the first 21 days of this period the mangos were stored at 12° C., and during the remainder of the experiment the mangos were stored at room temperature. The results are shown in Table 14.

TABLE 14

|  | Firmness (N) | Sugar (%) | Acid (%)* |
| --- | --- | --- | --- |
| Coated Mangos | 38.9 | 14.8 | 0.64 |
| Control Mango | 17.1 | 14.1 | 0.25 |

*Acid percentage was determined based on the percentage of citric acid.

Comprehensive taste tests were performed by experts at the end of the experiment. Results are shown in Table 15.

TABLE 15

|  | Sweetness (1-9 points) | Sourness (1-9 points) | Aftertaste (1-9 pt.) | General Flavor (1-9 points) |
| --- | --- | --- | --- | --- |
| Coated Mangos | 5.38 | 3.77 | 2.11 | 5.82 |
| Control Mangos | 5.05 | 2.16 | 2.38 | 4.47 |

Overall taste preferences were as follows:
92.8% preference for coated melons.
7.2% preference for control melons.

Example 14

An aqueous dispersion was prepared as in Example 13, however, without the ethanol. The dispersion was cooled as described above.

Mangos of the Kit strain, were washed, and the dispersion was applied to them from above using an automated spraying and brushing apparatus. The dispersion was allowed to dry, then the fruit was packaged and stored at 12° C. for 14 days, then at room temperature or an additional 5 days. During this time, their degree of weight loss and external appearance were recorded, and compared to control uncoated mangos stored under identical conditions. Results are shown in Table 16.

TABLE 16

|  | Weight loss (%) | | Firmness (N) | |
| --- | --- | --- | --- | --- |
|  | After 2 wks (12° C.) | 5 more days (room temp.) | After 2 wks. (12° C.) | 5 more days at (room temp.) |
| Coated Mangos | 2.7 | 4.2 | 64.9 | 37.6 |
| Control Mangos | 3.9 | 5.8 | 14.0 | 13.4 |

Weight loss was reduced in the coated fruit compared to the uncoated fruit, and external appearance of the coated fruit, including firmness, was retained. Taste tests rated the coated fruit better than the uncoated fruit.

Example 15

An aqueous dispersion of the following components was prepared:

| Component | Conc., % (wt./wt.) |
| --- | --- |
| Beeswax | 6.0 |
| Cottonseed oil | 1.5 |
| Soft resin | 1.5 |

-continued

| Component | Conc., % (wt./wt.) |
| --- | --- |
| Potassium carbonate | ~0.4 (to pH 9.0) |
| Ethanol | 11.5 |
| Water | Up to 100 |

The dispersion was prepared by adding the soft resin to water while blending, then adding the potassium carbonate. The resultant solution, which acts as an emulsifier, was heated to 70-75° C., and a pre-dissolved mixture of cottonseed oil and liquefied beeswax was added while blending (at approx. 25,000 RPM). Ethanol was then added. The resultant dispersion was cooled, and applied to chicken eggs. The eggs were dried under an air current, and stored for 35 days at 6° C., then for 7 additional days at room temperature. During this period, the relative weight loss and the external appearance of the eggs were recorded, and compared to that of control, uncoated eggs stored under similar conditions. Results are shown in Table 17.

TABLE 17

|  | Weight loss (%) | |
| --- | --- | --- |
| Time | Coated Eggs | Control Eggs |
| 7 days | 0.3 | 1.6 |
| 14 days | 0.6 | 3.1 |
| 21 days | 0.9 | 4.7 |
| 30 days | 1.2 | 6.3 |
| 37 days | 1.4 | 8.0 |

Weight loss was reduced in the coated eggs compared to the uncoated eggs. When the experiment was concluded, the eggs were opened to view the appearance of their contents. The egg-whites within the coated eggs remained transparent and unchanged, while the egg-whites of the uncoated eggs appeared cloudy, which indicates bacterial growth in the uncoated egg-whites. The yolks of the coated eggs seemed to have retained their physical proportions, being rounded and full. The yolks of the uncoated eggs were cloudy, and appeared shrunken within the yolk membrane.

Example 16

An aqueous dispersion was prepared according to the following component composition:

| Component | Conc., % (wt./wt.) |
| --- | --- |
| Beeswax | 2.0 |
| Sunflower Oil | 0.2 |
| Guar Gum | 0.01 |
| Potassium Carbonate | ~0.01 (until pH level 9.2) |
| Ethanol | 15.0 |
| Water | Up to 100 |

Gradually adding hot water to the mixed Ethanol, Beeswax, Sunflower Oil hitted at 70-75° C. at approx. 25,000 RPM, which contains Guar Gum and Potassium Carbonate.

Upon cooling, a dispersion was obtained, which was then used to coat agricultural produce.

In this example, pineapple were coated with the above-mentioned dispersion by dipping of the pineapples into the dispersion and drying under an air stream. The coated pineapples were stored at a temperature of 9° C. for 15 days, then at room temperature for 5 additional days and their external appearance and percentage of weight loss were followed over a period of several weeks, and compared to the appearance and percent weight loss seen in uncoated control pineapples. The results were as follows (Table 18):

TABLE 18

| | Weight loss (%) | |
|---|---|---|
| Time | Coated Pineapples | Control Pineapples |
| 5 days | 1.6 | 2.6 |
| 10 days | 3.4 | 5.0 |
| 15 days | 4.5 | 6.9 |
| 20 days | 9.1 | 13.2 |

The results portrayed in Table 18 illustrate the percentage of weight loss was significantly lower in the coated pineapples versus the uncoated pineapples. The coated pineapples retained their external appearance throughout 2.0 days of storage, while uncoated pineapples began to show signs of decay. Taste tests were performed when the experiment was ended, and showed the coated pineapples retained their taste over the length of the experiment, while in uncoated pineapples the taste was marred by the end of the experiment Example 17

An aqueous dispersion was prepared according to the following component composition:

| Component | Conc., % (wt./wt.) |
|---|---|
| Beeswax | 3.0 |
| Rapeseed Oil | 0.2 |
| Green Tea Water | 1.0 |
| Sodium Carbonate | ~0.05 |
| | (until pH level 8.8) |
| Water | Up to 100 |

We add to water containing Green Tea which has been heated up to 75-80° C. strongly mixed at approx. 25,000 RPM, with rapeseed Oil and beeswax. And we proceed without stopping the mixing, to add Sodium Carbonate.

Upon cooling, a dispersion was obtained, which was then used to coat agricultural produce.

In this example, strawberries were coated with the above-mentioned dispersion by dipping of the strawberries into the dispersion and drying under an air stream. The coated strawberries were stored at a temperature of 4° C., for 3 days, then at room temperature for 2 additional days, and their external appearance and percentage of weight loss were followed over a period of several days, and compared to the appearance and percent weight loss seen in uncoated control strawberries. The results were as follows (Table 19):

TABLE 19

| | Weight loss (%) | |
|---|---|---|
| Time | Coated Strawberrys | Control Strawberrys |
| 3 days | 4.2 | 10.1 |
| 5 days | 11.2 | 22.7 |

The results portrayed in Table 19 illustrate the percentage of weight loss was significantly lower in the coated strawberries versus the uncoated strawberries. The coated strawberries retained their external appearance throughout 5 days of storage, while uncoated strawberries began to show signs of decay. Taste tests were performed when the experiment was ended, and showed the coated strawberries retained their taste over the length of the experiment, while in uncoated strawberries the taste was marred by the end of the experiment.

Example 18

An aqueous dispersion was prepared according to the following component composition:

| Component | Conc., % (wt./wt.) |
|---|---|
| Beeswax | 1.5 |
| Sesame Oil | 0.01 |
| Ethanol | 5.0 |
| Sodium Carbonate | ~0.01 |
| | (until pH level 9.0) |
| Water | Up to 100 |

The dispersion was prepared by adding an aqueous solution containing sodium carbonate and ethanol to the mix of melted beeswax component and sesame oil, at a temperature of 74-76° C., while blending rapidly (at approx. 25,000 RPM).

Upon cooling, a dispersion was obtained, which was then used to coat agricultural produce.

In this example, kumquats were coated with the above-mentioned dispersion by dipping of the kumquats into the dispersion and drying under an air stream. The coated kumquats were stored at a temperature of 6° C., and their external appearance and percentage of weight loss were followed over a period of several weeks, and compared to the appearance and percent weight loss seen in uncoated control kumquats. The results were as follows (Table 20):

TABLE 20

| | Weight loss (%) | |
|---|---|---|
| Time | Coated Kumquats | Control Kumquats |
| 7 days | 4.3 | 10.4 |
| 14 days | 7.7 | 18.8 |
| 21 days | 11.4 | 25.6 |

The results portrayed in Table 20 illustrate the percentage of weight loss was significantly lower in the coated kumquats versus the uncoated kumquats. The coated kumquats retained their external appearance throughout 2.1 days of storage, while uncoated kumquats began to show signs of decay. Taste tests were performed when the experiment was ended, and showed the coated kumquats retained their taste over the length of the experiment, while in uncoated kumquats the taste was marred by the end of the experiment.

Example 19

An aqueous dispersion was prepared according to the following component composition:

| Component | Conc., % (wt./wt.) |
|---|---|
| Beeswax | 4.0 |
| Lecitin | 0.05 |
| Grapeseed Oil | 0.6 |
| Sodium Carbonate | ~0.07 (until pH level 9.5) |
| Water | Up to 100 |

The dispersion was prepared by forming a solution of lecithin and sodium carbonate, then heating to 70-75° C. A pre-dissolved liquefied beeswax was added while blending, followed by addition of grapeseed oil while blending (at approx. 25,000 RPM).

Upon cooling, a dispersion was obtained, which was then used to coat agricultural produce.

In this example, figs were coated with the above-mentioned dispersion by dipping of the figs into the dispersion and drying under an air stream. The coated figs were stored at a temperature of 8° C., and their external appearance and percentage of weight loss were followed over a period of several days, and compared to the appearance and percent weight loss seen in uncoated control figs. The results were as follows (Table 21):

TABLE 21

| | Weight loss (%) | |
|---|---|---|
| Time | Coated Figs | Control Figs |
| 4 days | 5.6 | 9.3 |
| 9 days | 11.0 | 16.9 |
| 14 days | 18.3 | 27.1 |

The results portrayed in Table 21 illustrate the percentage of weight loss was significantly lower in the coated figs versus the uncoated figs. The coated figs retained their external appearance throughout 14 days of storage, while uncoated figs began to show signs of decay. Taste tests were performed when the experiment was ended, and showed the coated figs retained their taste over the length of the experiment, while in uncoated figs the taste was marred by the end of the experiment.

Example 20

An aqueous dispersion was prepared according to the following component composition:

| Component | Conc., % (wt./wt.) |
|---|---|
| Beeswax | 0.01 |
| Ethanol | 8.0 |
| Sodium Carbonate | ~0.005 (until pH level 10) |
| Water | Up to 100 |

The dispersion was prepared by adding an aqueous solution containing sodium carbonate and ethanol to the melted beeswax component, at a temperature of 74-76° C., while blending rapidly (at approx. 25,000 RPM).

Upon cooling, a dispersion was obtained, which was then used to coat agricultural produce.

In this example, sweet cherries were coated with the above-mentioned dispersion by dipping of the sweet cherries into the dispersion and drying under an air stream. The coated sweet cherries were stored at a temperature of 8° C., and their external appearance and percentage of weight loss were followed over a period of several days, and compared to the appearance and percent weight loss seen in uncoated control sweet cherries. The results were as follows (Table 22):

TABLE 22

| | Weight loss (%) | |
|---|---|---|
| Time | Coated Sweet Cherries | Control Sweet Cherries |
| 5 days | 2.5 | 5.3 |
| 10 days | 6.1 | 11.8 |
| 15 days | 9.6 | 18.7 |

The results portrayed in Table 22 illustrate the percentage of weight loss was significantly lower in the coated SWEET cherries versus the uncoated SWEET cherries. The coated sweet cherries retained their external appearance throughout 15 days of storage, while uncoated sweet cherries began to show signs of decay. Taste tests were performed when the experiment was ended, and showed the coated sweet cherries retained their taste over the length of the experiment, while in uncoated sweet cherries the taste was marred by the end of the experiment.

It is possible to get similar results to all those presented at the whole tables also when the dispersion could be done in different ways.

The invention claimed is:

1. A process for making an aqueous dispersion for coating fruits, vegetables, fowl eggs and organically grown produce, comprising dispersing:
   a) a hydrophobic component comprising a natural wax and a vegetable oil, or vegetable oil;
   b) an alkali agent;
   c) an additive selected from the group consisting of rosemary extract, sage extract, green tea water, eucalyptus oil, lavender oil, citrus peel oil, ethanol, chamomile ethanolic extract, cypress ethanolic extract, prickly pear ethanolic extract, and aloe ethanolic extract;
   in d) water;
   wherein the hydrophobic component and the additive are from natural biological sources and; wherein the aqueous dispersion is free of any additional emulsifiers.

2. The process of claim 1, wherein the natural wax is selected from the group consisting of beeswax, candelilla wax, carnauba wax and berry wax.

3. The process of claim 1, wherein the vegetable oil is selected from the group consisting of soybean oil, palm oil, corn oil, wheat germ oil, olive oil, linseed oil, cotton seed oil, sunflower oil, rapeseed oil, sesame oil and grapeseed oil.

4. The process of claim 1, wherein the alkali agent is selected from the group consisting of sodium carbonate, sodium bicarbonate, potassium carbonate, potassium bicarbonate, sodium hydroxide and potassium hydroxide.

5. The process of claim 1, wherein the dispersion further comprises a protective colloid.

6. The process of claim 5, wherein the protective colloid is present in an amount of greater than 0% and less than 1% by weight of the dispersion.

7. The process of claim 5, wherein the protective colloid is selected from the group consisting of a protein, a polysaccharide, a phosphoprotein and a phospholipid.

8. The aqueous dispersion of claim 7, wherein the protein is selected from the group consisting of casein and gelatin.

9. The process of claim 7, wherein the phospholipid is lecithin.

10. The aqueous dispersion of claim 7, wherein the polysaccharide is selected from the group consisting of xanthan, dextrin, alginic acid, agar and guar gum.

11. The process of claim 1, wherein the additive c) comprises ethanol in combination with a member selected from the group consisting of rosemary extract, sage extract, green tea water, eucalyptus oil, lavender oil, citrus peel oil, chamomile ethanolic exact, cypress ethanolic extract, prickly pear ethanolic extract and aloe ethanolic extract.

12. The process of claim 1, wherein the additive c) is present in an amount of not greater than 15% by weight.

13. The process of claim 1, wherein the dispersion has a pH in the range of 6-10.

14. The process of claim 1, wherein the hydrophobic component is present in an amount of 0.01-9% by weight of the dispersion.

15. The aqueous dispersion of claim 1, wherein the fruits are selected from the group consisting of apples, olives, peaches, plums, lemons, kiwis, oranges, mandarins, avocados, melons, mangos, pineapples, strawberries, kumquats, figs, and cherries.

16. The process of claim 1, wherein the fruits are citrus fruits.

17. The process of claim 1, wherein the vegetables are selected from the group consisting of cucumbers and tomatoes.

18. A process for making an aqueous dispersion for coating fruits, vegetables, fowl eggs and organically grown produce, comprising dispersing:
   a) a hydrophobic component comprising a natural wax and a vegetable oil, or vegetable oil;
   b) an alkali agent;
   c) an additive selected from the group consisting of rosemary extract, sage extract, green tea water, eucalyptus oil, lavender oil, citrus peel oil, ethanol, chamomile ethanolic extract, cypress ethanolic extract, prickly pear ethanolic extract, and aloe ethanolic extract;
   d) and emulsifier selected from the group consisting of nicotinic acid, pantothenic acid, ascorbic acid, vitamin B3 salt, vitamin B5 salt, wood rosin, soft resin, shellac, free acids of a natural wax and salts or derivatives thereof;
   in e) water;
   wherein the hydrophobic component and the additive are from natural biological sources and; wherein the aqueous dispersion is free of any additional emulsifiers.

19. The process of claim 18 wherein the emulsifier is present in an amount of 0.1 to 3% by weight of the dispersion.

20. A method for coating fruits, vegetables, fowl eggs and organically grown produce, comprising dispersing:
   a) a hydrophobic component comprising a natural wax and a vegetable oil, or vegetable oil;
   b) an alkali agent;
   c) an additive selected from the group consisting of rosemary extract, sage extract, green tea water, eucalyptus oil, lavender oil, citrus peel oil, ethanol, chamomile ethanolic extract, cypress ethanolic extract, prickly pear ethanolic extract, and aloe ethanolic extract;
   in d) water;
   wherein the hydrophobic component and the additive are from natural biological sources and; wherein the aqueous dispersion is free of any additional emulsifiers; applying the aqueous dispersion to agricultural produce and fowl eggs by dipping the produce or the fowl eggs into the aqueous dispersion, or spreading the aqueous dispersion on the surface of the produce or the fowl eggs and; dehydrating the aqueous dispersion.

21. A process for making an aqueous dispersion formulated for improving storability of organically-grown produce, comprising dispersing:
   a) a hydrophobic component comprising a natural wax and a vegetable oil, or vegetable oil;
   b) an alkali agent;
   c) an additive selected from the group consisting of rosemary extract, sage extract, green tea water, eucalyptus oil, lavender oil, citrus peel oil, ethanol, chamomile ethanolic extract, cypress ethanolic extract, prickly pear ethanolic extract, and aloe ethanolic extract;
   in d) water;
   wherein the hydrophobic component a) and the additive c) are from natural biological sources and; wherein the aqueous dispersion is free of additional emulsifiers.

22. The process of claim 21, wherein the dispersion is formulated for coating at least one type of produce selected from the group consisting of fruits, vegetables and fowl eggs.

23. A process for making an aqueous dispersion formulated for improving storability of organically-grown produce, comprising dispersing:
   (a) 0.01 to 9% w/w olive oil;
   (b) 0.01 to 6% w/w beeswax;
   (c) 2.5 to 15% w/w of an ethanolic solution and;
   (d) at least 0.005% w/w of a cationic carbonate salt;
   In (e) water; wherein the aqueous dispersion is free of any additional emulsifiers.

24. The process according to claim 23, wherein the ethanolic solution is provided as ethanol.

25. The process according to claim 23, wherein the cationic carbonate salt is provided as sodium carbonate.

* * * * *